(12) United States Patent
Pawar et al.

(10) Patent No.: US 11,281,764 B2
(45) Date of Patent: Mar. 22, 2022

(54) SAFE BATTERY AUTHENTICATION

(71) Applicant: INTEL CORPORATION, Santa Clara, CA (US)

(72) Inventors: Sagar C. Pawar, Bangalore (IN); Panner Kumar, Bangalore (IN); Karunakara Kotary, Portland, OR (US); Ovais F. Pir, Srinagar (IN)

(73) Assignee: INTEL CORPORATION, Santa Clara, CA (US)

( * ) Notice: Subject to any disclaimer, the term of this patent is extended or adjusted under 35 U.S.C. 154(b) by 153 days.

(21) Appl. No.: 16/457,561

(22) Filed: Jun. 28, 2019

(65) Prior Publication Data
US 2020/0410084 A1 Dec. 31, 2020

(51) Int. Cl.
| | |
|---|---|
| *G06F 21/44* | (2013.01) |
| *G06F 21/81* | (2013.01) |
| *G01R 31/3835* | (2019.01) |
| *G01R 31/36* | (2020.01) |
| *H04L 9/32* | (2006.01) |
| *G06F 9/4401* | (2018.01) |

(52) U.S. Cl.
CPC ......... *G06F 21/44* (2013.01); *G01R 31/3647* (2019.01); *G01R 31/3835* (2019.01); *G06F 21/81* (2013.01); *H04L 9/32* (2013.01); *G06F 9/4401* (2013.01)

(58) Field of Classification Search
CPC .... H04M 1/00; H02J 7/00; B60K 1/00; G08B 5/22; G06F 21/81; G06F 21/44; G06F 13/42; G06F 12/14; G01R 31/3647; G01R 31/3835; G01R 31/36; H04L 9/32; H04L 9/3271
See application file for complete search history.

(56) References Cited

U.S. PATENT DOCUMENTS

| | | | | |
|---|---|---|---|---|
| 5,498,950 | A * | 3/1996 | Ouwerkerk | B60L 58/21 320/119 |
| 7,498,766 | B2 * | 3/2009 | Paul | H02J 7/00047 320/106 |
| 7,538,518 | B2 * | 5/2009 | Wang | H02J 7/0029 320/112 |
| 8,278,870 | B2 * | 10/2012 | Little | H01M 10/4257 320/106 |
| 8,602,140 | B2 * | 12/2013 | White | H02J 7/0031 180/65.1 |
| 8,633,801 | B2 * | 1/2014 | Iwai | G06F 1/28 340/5.8 |
| 8,652,670 | B2 * | 2/2014 | Uchida | H02J 7/00036 429/90 |
| 2015/0172054 | A1 | 6/2015 | Prakash et al. | |

\* cited by examiner

*Primary Examiner* — Thanhnga B Truong
(74) *Attorney, Agent, or Firm* — Schwabe, Williamson & Wyatt, P.C.

(57) ABSTRACT

In some examples, an apparatus to authenticate a battery includes a battery voltage monitor to monitor a voltage of the battery. The apparatus to authenticate the battery also includes a voltage source regulator to filter the voltage of the battery and provide the filtered voltage to turn on circuitry to be used to authenticate the battery.

24 Claims, 5 Drawing Sheets

400

SAFE BATTERY AUTHENTICATION

TECHNICAL FIELD

This disclosure relates generally to safe battery authentication.

BACKGROUND

Mobile computing devices can provide convenience to users by allowing them to perform various computing tasks from a variety of locations. Mobile computing devices can include, for example, cellular phones, smartphones, tablets, wearables, notebooks, laptops, personal digital assistants, and/or mobile processor based platforms, among others. A mobile power supply such as a battery is typically included in a mobile computing device housing or somehow coupled with the mobile computing device to provide power to the device without requiring wired power and/or an adapter such as an alternating current (AC) adapter. A battery designed for a computing device can help ensure proper and safe operation of the device. However, using a battery that is not designed or approved for the computing device can result in dangerous and/or negative consequences. For example, using an unapproved battery may cause supply of energy to the device at an unsafe level, which can lead to fire or damage to the platform, or at an insufficient level, which may cause unacceptable performance of the device. Such a battery may also introduce malware to the computing device via malicious code included, for example, in memory coupled to the battery.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
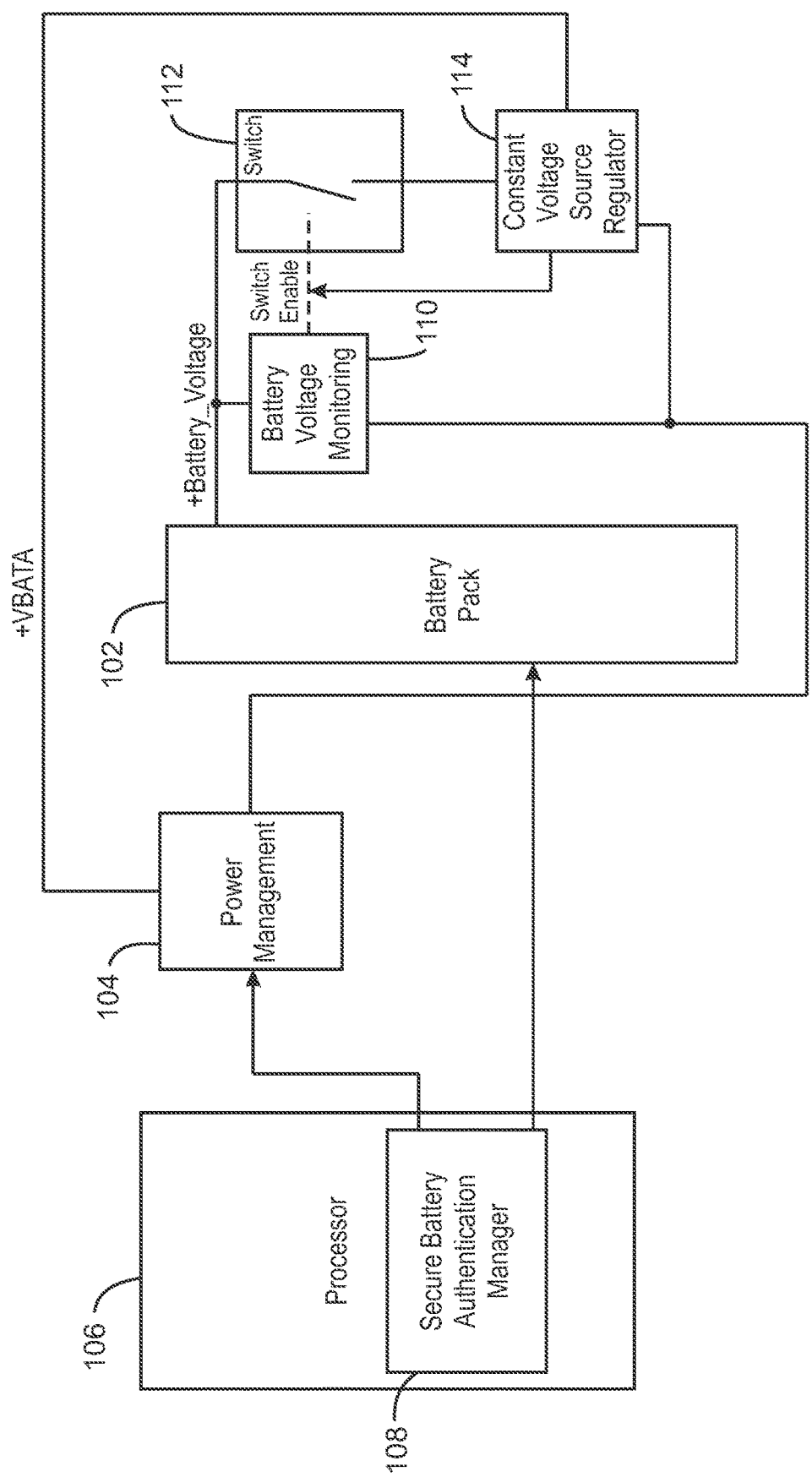
FIG. 1 illustrates a system in accordance with some embodiments.

Some embodiments relate to safe battery authentication. In some embodiments, voltage filtering may be implemented to take advantage of small voltage and current of a new battery to power up authentication logic of the system in order to implement battery authentication without powering up the entire system (for example, without booting up the system). In some embodiments, voltage is filtered from the battery without booting up the system and the small amount of filtered voltage is provided to logic capable of authenticating the battery. In this manner, the voltage from the battery to be authenticated is not provided to the system. The filtered voltage is only provided to power the authentication circuitry used to authenticate the battery, and voltage is not otherwise provided to the system from the battery to be authenticated until after the battery is authenticated.

Many computing systems do not use battery authentication. However, battery authentication is very important, since a fraudulent battery can damage the device or cause it to malfunction. This can result in fire, with a battery bursting while charging. Systems that do use battery authentication typically use power from an AC adapter to power battery authentication logic.

Some embodiments relate to safe battery authentication when a new battery is connected to a system such as a mobile computing system. Some embodiments allow for such safe battery authentication without an adapter such as an alternating current (AC) adapter being connected to the system.

An AC adapter can be used for battery authentication of a mobile computing device. For example, such an adapter may be used to bring up power to a controller (for example, a microcontroller) that is used to implement authentication of the battery. However, a user may not be able to connect an AC adapter to a computing device under certain conditions. For example, if a user has previously purchased one or more fresh batteries but is travelling in a remote location with no access to electricity from a wall source, or the AC adapter of the device has gone bad, such a solution of using an AC adapter to authenticate a new battery may not be viable. The current battery may be draining and the user may wish to replace the current battery with a new battery that needs to be authenticated. In a computing device (for example, a computing system) in which the device requires using an AC adapter to authenticate a battery, the device may not be able to boot even with a genuine battery, since battery authentication requires connection of a functioning AC adapter.

An embedded controller (EC) can be a microcontroller in computing devices (or systems) that handle various system tasks that the operating system (OS) does not handle. Some computing devices can include such a dedicated onboard microcontroller (or EC) to help implement battery authentication. However, in some embodiments, battery authentication may be implemented without using an EC.

In accordance with some embodiments, battery authentication can include making sure that the battery connected to the device is compatible with that device and that the battery serves the power needs of the system. Battery authentication can also include making sure that the battery is from a genuine vendor and will not result in a chemical or physical hazard such as, for example, explosions, blasts, and/or leaks, among others. Battery authentication can also include ensuring that the battery provides an adequate power supply and does not damage the device. The business and/or reputation of an original equipment manufacturer (OEM) of the device may be at stake if someone uses a counterfeit battery causing performance and/or system damage, for example.

Battery authentication may be attempted using one or more external microcontroller such as an embedded controller. A simple and cost effective solution is identification-based authentication, but may not be very secure. Challenge and response based authentication may be implemented at a moderate cost with moderate security. Challenge and response Secure Hash Algorithm 1 cryptography (SHA-1) based authentication may be implemented at a high cost with high security. However, such solutions may not ensure safe battery authentication in situations where an AC adapter is not connected to the device.

In implementations requiring an AC adapter connected to the device, it is not possible to authenticate the battery when it is connected to the device for the first time unless the AC adapter is connected as well. Additionally, without a dedicated onboard microcontroller, battery authentication may not work, and adding a dedicated microcontroller can add cost and required real estate space within the device. The implementations suggested above can include tradeoffs between security and cost. For example, identification based authentication can be inexpensive but may not be secure. However, SHA-1 based authentication may be very secure, but can also be expensive.

U.S. Patent Publication 2015/0172054 A1 published on Jun. 18, 2015 relates to secure battery authentication. This patent publication discloses battery authentication, and discloses that the system needs to boot or to be functional for authentication to take place. The patent publication but does not discuss powering up a system and authenticating the battery if an adapter is not connected to boot up the system.

In an implementation where an AC adapter is not connected to a system and the system battery is drained (for example, the system is off/dead), it may be unsafe to connect a new battery and turn off the system. The system motherboard may be damaged, for example, if the wrong voltage is provided to the system. Therefore, in some embodiments, a safe voltage is generated when a new battery is connected to the system (that is, filtering of the voltage from the new battery is implemented). In some embodiments, a small amount of current is necessary and used for battery authentication of the new battery. Since the authenticity of a new battery is not always evident to a user, and since stickers and compliance can be misleading, voltage from a new battery can be filtered in accordance with some embodiments, and the filtered safe voltage can be provided to implement battery authentication without powering up the entire system. Once the safe voltage level is filtered, that safe voltage may be provided to a portion of the system including partial circuits used to authenticate the new battery. In some embodiments, a safe voltage may be generated to turn on a fuel gauge of the system.

Some embodiments relate to safely turning on a portion of a computing device and authenticating a battery with safe voltage generation. In some embodiments, unless the battery is authenticated, the computing device (computing system) is not completely powered up and will not boot, allowing significant reduction in risk of damaging the device.

FIG. 1 illustrates a computing device 100 in accordance with some embodiments. In some embodiments, computing device 100 may be referred to, for example, as a device 100, a system 100, and/or a computing system 100. Computing device 100 may include a battery pack 102 (for example, a removable battery pack 102), power management device 104 (for example, a power manager, a power management controller or PMC, and/or a power management integrated circuit or PMIC), and a processor 106 (for example, a system on chip or SoC). Processor 106 can include a secure battery authentication manager 108. In some embodiments, secure battery authentication manager 108 may be an engine running security such as cryptography. In some embodiments, for example, secure battery authentication manager 108 is an Intel® Converged Security and Management Engine (CSME) running a crypto algorithm for battery authentication. In some embodiments, secure battery authentication manager 108 can provide a battery authentication signal to power management 104. For example, in some embodiments, secure battery authentication manager 108 can provide a General Purpose Input Output (GPIO) battery authentication signal such as a PMIC_GPIO_BAT_AUTH to power management 104 (for example, to PMIC 104). In some embodiments, secure battery authentication manager 108 can provide battery authentication of battery pack 102 using, for example, cryptography security measures.

In some embodiments, computing device 100 includes battery voltage monitoring circuit 110, switch 112, and constant voltage source regulator 114. Battery voltage monitoring circuit 110, switch 112, and constant voltage source regulator 114 can be referred to as a safe voltage generating logic, and can be implemented, for example, on a board of the device 100. Battery voltage monitoring circuit 110, switch 112, and constant voltage source regulator 114 can filter extra voltage coming from battery pack 102 in order to provide a safe voltage (for example, voltage +VBATA) to power management 104. Power management 104 can use the safe filtered voltage provided from monitoring circuit 110, switch 112, and voltage regulator 114 to safely authenticate the battery pack 102. In some embodiments, the safe voltage generating logic of circuit 110, switch 112, and voltage regulator 114 can filter extra voltage coming from battery pack 102 in order to provide a safe voltage to the rest of the system 100. In some embodiments, if battery pack 102 provides less voltage than required, no voltage might be provided to power management 104, and no action is taken.

After filtering the voltage from battery pack 102, the safe voltage generating logic of circuit 110, switch 112, and voltage regulator 114 can pass the filtered voltage to power manager 104. Power manager 104 can bring up the secure battery authentication manager 108. Secure battery authentication manager 108 can then communicate with the battery pack 102, and implement battery authentication using cryptographic technologies, for example. If the secure battery authentication manager 108 determines that the battery pack 102 is legitimate, secure battery authentication manager 108 can pass a signal to the power manager 104 (for example can pass a GPIO signal such as a PMIC_GPIO_BAT_AUTH signal) indicating that the battery pack 102 has been authenticated and that is safe to bring up the rest of the system 100 (for example, to book up the system 100). If the secure battery authentication manager 108 determines that the battery pack 102 is not legitimate, secure battery authentication manager 108 can provide a signal to the power manager 104 (for example can pass a GPIO signal such as a PMIC_GPIO_BAT_AUTH signal) indicating that the battery pack 102 is not legitimate and has not been authenticated. In response, a signal may be sent to the battery voltage monitoring circuit 110, the switch 112, and/or the constant voltage source regulator 114 to stop providing the safe voltage. This can be implemented using an I2C signal such as, for example, an I2C_SCL and/or an I2C_SDA signal (or signals) provided between the power manager 104, the battery voltage monitoring circuit 110, and/or the constant voltage regulator 114. In some embodiments, the signals between the power manager 104 and the battery voltage monitoring circuit 110 and constant voltage source regulator 114 can be used for control and monitoring purposes, for example.

In some embodiments, voltage from the new battery 102 to be authenticated is filtered and supplied for battery authentication only, instead of providing the battery voltage supply to the entire system 100. The filtered safe voltage is provided to power up a battery voltage monitoring device such as battery voltage monitoring device 110 illustrated in FIG. 1, which can compare a desired voltage (for example, a desired voltage stored in memory) with an actual monitored voltage from the new battery. The safe voltage monitoring and filtering logic illustrated in FIG. 1 (for example, including battery voltage monitor 110, switch 112, and voltage source regulator 114) can be included on the board of the system 100. However, in some embodiments, the safe voltage monitoring and filtering logic may be included in a power management controller such as power management 104 and/or an Intel® PMIC. In some embodiments, once the battery is authenticated and a voltage of the battery passes, an authentication module may be included, for example, in a platform controller hub (PCH) controller, an integrated sensor hub (ISH) controller, etc. to authenticate. That is, in some embodiments, the secure battery authentication manager 108 may be included in a PCH controller and/or ISH controller.

In some embodiments, the battery voltage (+Battery_Voltage) from the battery (battery pack) 102 to be authenticated is monitored by battery voltage monitoring circuit 110. While the voltage is being monitored, the circuit including monitoring circuit 110, switch 112, and voltage source regulator 114 does not allow the battery voltage to be supplied to the entire system. Switch 112 (which may be a transistor in some embodiments) is controlled (for example, controlled by battery voltage monitoring circuit 110 and/or constant voltage source regulator 114, allowing the battery voltage to pass through to constant voltage source regulator 114. Switch 112 may be in a default open state (switch turned off), and can be closed (switch turned on) by the battery voltage monitoring circuit 110 and/or the constant voltage source regulator 114 to allow the battery voltage to pass through to the constant voltage source regulator 114. In some embodiments, battery voltage monitoring circuit 110 identifies when a battery 102 is inserted into the system by identifying that some voltage (+Battery_Voltage) is being provided. Once battery voltage monitoring circuit 110 identifies that a safe voltage is provided as the battery voltage (for example, the voltage is not too high or too low), circuit 110 allows the switch 112 to be turned on (closed) and the battery voltage is provided to the constant voltage source regulator 114.

When switch 112 is turned on (closed), voltage source regulator 114 can generate a safe voltage (and/or can filter the battery voltage) so that the safe voltage +VBATA is provided as a constant source to the power management circuit 104 to be used to authenticate the battery 102. The safe voltage +VBATA may be used to power up the power management device 104. Once the power management device 104 is powered up using the safe voltage +VBATA, it can then authenticate the battery (battery pack) 102 using battery authentication logic. Once the battery 102 has been authenticated in this manner, the battery voltage +Battery_Voltage may be provided to the whole system.

In some embodiments, the system may be protected from fraudulent or corrupted battery packs by filtering the voltage, and selectively powering up safe voltage monitoring and filtering logic and/or battery authentication logic to authenticate battery voltage. In some embodiments, the battery may be authenticated using PCH and/or ISH logic so that additional authentication chip logic need not be added. Additionally, additional logic for filtering and monitoring the voltage may not be necessary, since existing Intel® PMIC may be used for the voltage monitoring and filtering.

Figure 2:
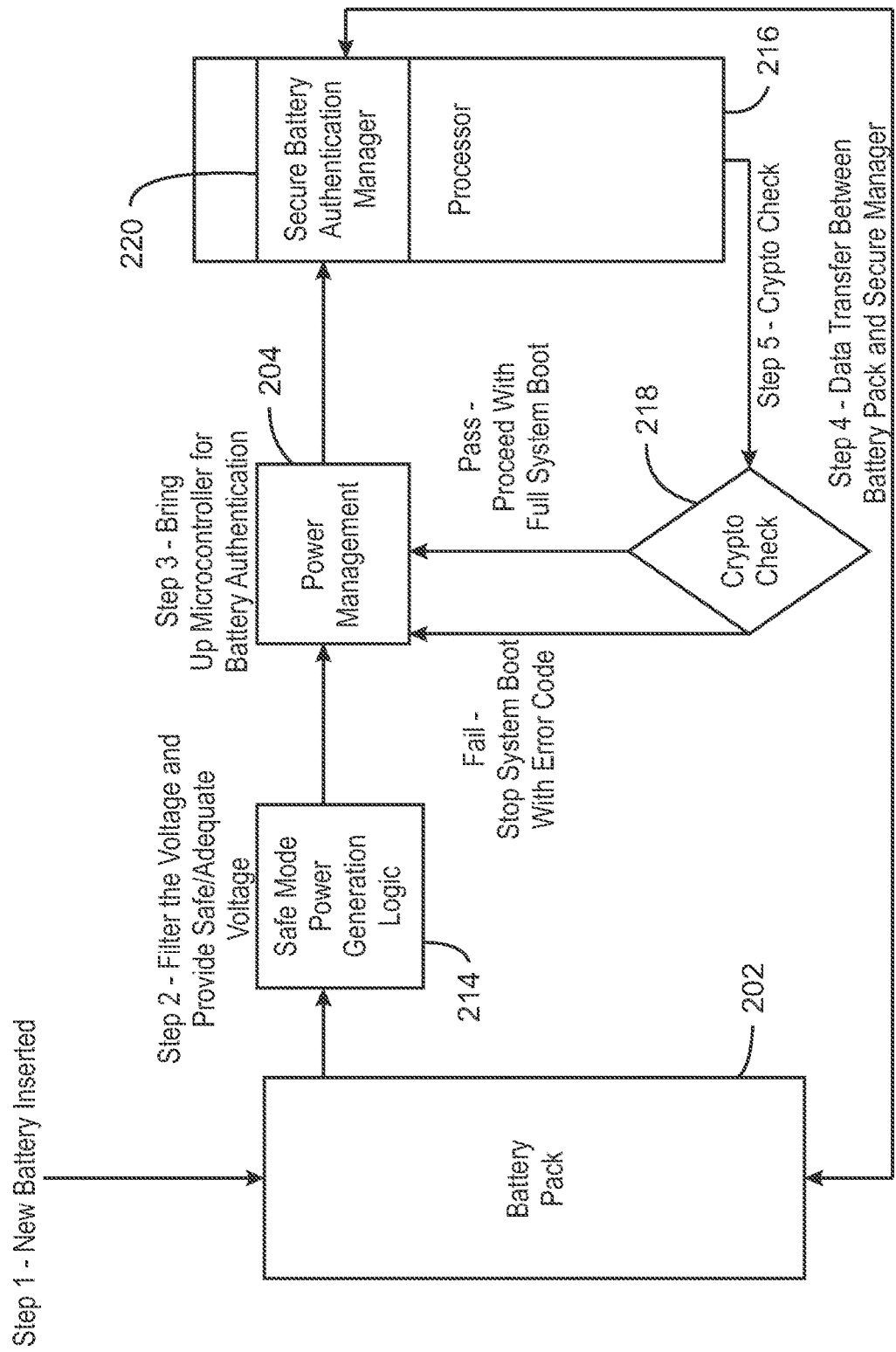
FIG. 2 illustrates a system and/or flow in accordance with some embodiments.

FIG. 2 illustrates a process flow 200 in a computing device. In some embodiments, FIG. 2 illustrates a process flow 200 implemented in a computing device such as, for example, computing device 100 illustrated in FIG. 1.

FIG. 2 includes a battery pack 202 and power management 204. In some embodiments, battery pack 202 may be the same as or similar to battery pack 102 of FIG. 1, and/or power management 204 may be the same as or similar to power management 104 of FIG. 1. FIG. 2 also includes safe mode power generation logic 214. In some embodiments, safe mode power generation logic 214 can be the same as or similar to the safe voltage generation logic implemented in device 100. For example, in some embodiments, safe mode power generation logic 214 may be implemented using battery voltage monitoring circuit 110, switch 112, and/or constant voltage source regulator 114 of computing device 100. FIG. 2 also includes a processor 216 which includes a secure battery authentication manager 220. In some embodiments, processor 216 may be the same as or similar to processor 106, and/or secure battery authentication manager 220 may the same as or similar to secure battery authentication manager 108. In some embodiments, diamond 218 represents a cryptography check. In some embodiments, cryptography check 218 may be implemented by secure battery authentication manager 220, for example.

Flow 200 includes a first step at which a new battery pack 202 is inserted into the system. Flow 200 includes a second step which may be implemented by safe mode power generation logic 214 to filter the voltage from the newly inserted battery pack 102, and provide a safe and/or adequate voltage to the power manager 204. Flow 300 includes a third step which may be implemented by the power manager 204 to bring up a microcontroller (for example, bring up secure battery authentication manager 220 of processor 216) for secure battery authentication. Flow 200 includes a fourth step in which data is transferred between the battery pack 202 and the secure battery authentication manager 220. Flow 200 includes a fifth step implementing a cryptography check 218. If the battery authentication crypto check 218 results in a passing of the battery authentication of the battery pack 202, a pass signal is sent to the power management 204 to instruct the power management 204 to proceed with a full system boot. If the battery authentication crypto check 218 results in a failure of the battery authentication of the battery pack 202, a fail signal is sent to the power management 204 to instruct the power management 204 to not proceed with a full system boot, and/or to stop any system boot (for example, using an error code).

Figure 3:
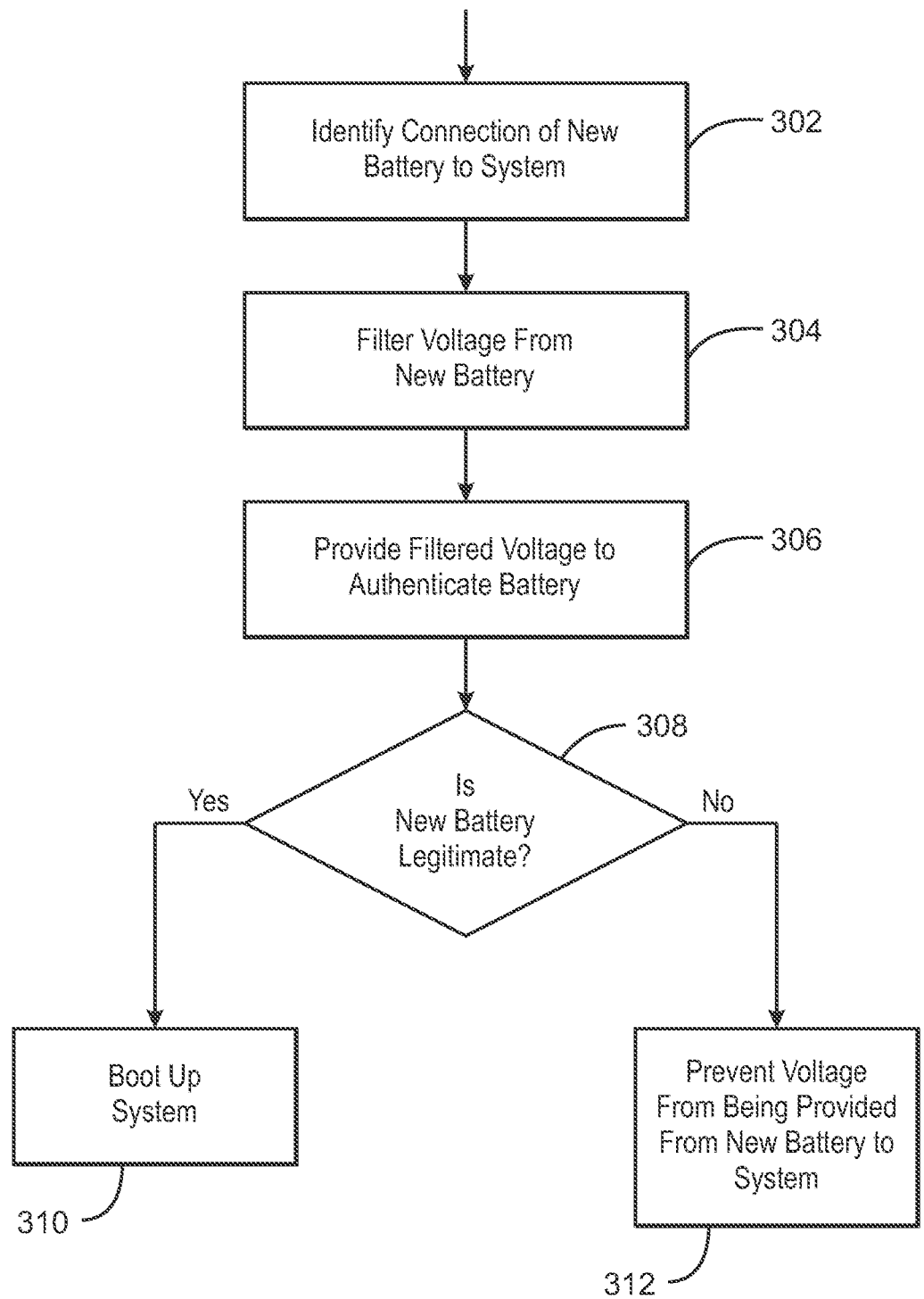
FIG. 3 illustrates a flow in accordance with some embodiments.

FIG. 3 illustrates a flow 300 in accordance with some embodiments. In some embodiments, flow 300 may be implemented by any of the systems, devices, processors, or any other systems or devices illustrated and/or described herein.

At 302, a connection of a new battery to a device or system is identified. Voltage from the new battery is filtered at 304. The filtered voltage may be provided, for example, to a power management device used to provide a limited amount of safe voltage which is adequate enough to authenticate the new battery but is not used to power up the entire system. The filtered voltage is provided to authenticate the new battery at 306. In some embodiments, the filtered voltage is provided at 306 to circuitry that is responsible for authenticating the battery (for example, to a power management device such as power management 104 or power management 204, for example).

In some embodiments, other than the filtered voltage provided to authenticate the battery, no other voltage is provided to the system from the battery to be authenticated until after the battery has been authenticated. Since prior to authentication the only voltage provided from the battery to be authenticated is the filtered voltage provided to circuitry that is responsible for authenticating the battery and no voltage is provided from the battery to power up the system prior to battery authentication, equipment damage due to illegitimate, incompatible and/or unauthorized batteries may be avoided in accordance with some embodiments.

At 308 a determination is made (for example, using a cryptography check) to determine if the new battery is legitimate. If the new battery is legitimate, the system is booted up at 310. If the new battery is not legitimate, voltage is prevented from being provided from the new battery to the system at 312 (for example, no voltage is provided to the system in addition to the filtered voltage provided to authenticate the new battery).

In some embodiments, a two-step battery authentication may be implemented, including a safe mode power generation followed by secure authentication. In accordance with some embodiments, safe battery authentication, safe mode power generation logic, and/or safe voltage generating logic may be implemented. Voltage generated from a new battery connected to a system or device may be filtered to provide only an adequate voltage to power management and/or to a processor or SoC implementing battery authentication without booting up the system or providing full power to the entire system. In this manner, safe battery authentication may be implemented without any wall power or AC adapter connected to the device or system. In some embodiments, authentication of the battery may be implemented using cryptography such as advanced cryptography techniques. In some embodiments, if the battery is authenticated, the rest of the system is powered on (for example, the system is booted up), and if the battery is not authenticated, no further action is taken, the system is not powered up, and/or power is not provided to the system.

In this manner, systems without an embedded controller may be used to authenticate a new battery without requiring use of wall power and/or an AC adapter. In some embodiments, no adapter is required for first time battery authentication. Safe mode power generation logic may be used in accordance with some embodiments to only supply a voltage to battery authentication logic that is adequate for the battery authentication. This can help to avoid equipment damage due to incompatible and/or defective battery sources, and enhance user experience.

In some embodiments, an extra onboard controller is not needed for battery authentication. For example, in some embodiments, an Intel® SoC and/or an Intel® processor may use a power management controller (PMC) and/or a Converged Security and Management Engine (CSME) to implement secure authentication (for example, to implement cryptography authentication). This can save cost, power, and real estate in a computing device or system.

Figure 4:
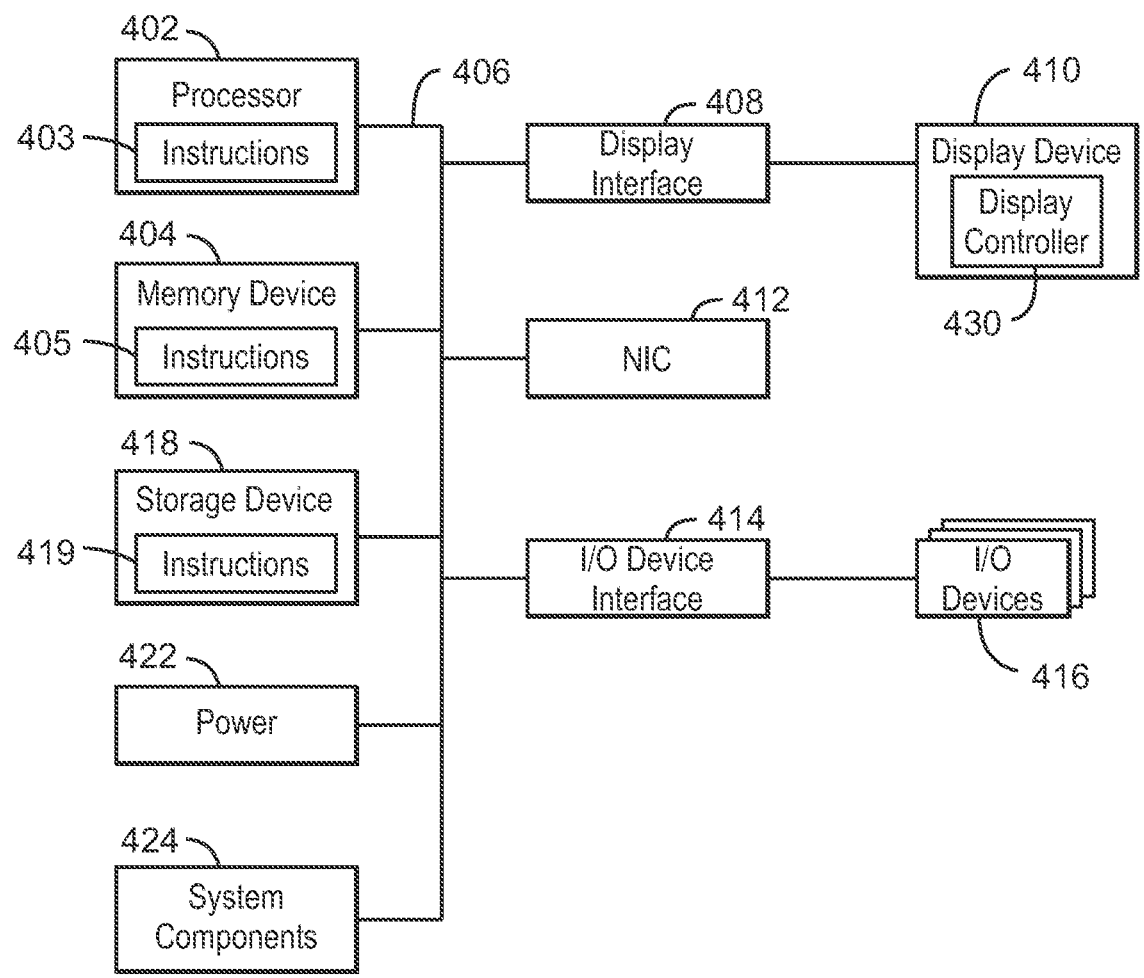
FIG. 4 illustrates a computing system in accordance with some embodiments.

FIG. 4 is a block diagram of an example of a computing device 400 in accordance with some embodiments. In some embodiments, computing device 400 may be a computing device including one or more elements of system 100 or system 200. For example, in some embodiments, computing device 400 can implement any of the techniques illustrated and/or described herein. In some embodiments, one or more elements of computing device 400 can implement flow 200 and/or flow 300. In some embodiments, computing device 400 may provide any techniques or functions illustrated and/or described herein.

In some embodiments, functions of computing device 400 can include, for example, secure battery authentication, and/or any other techniques described and/or illustrated herein, etc., according to some embodiments. In some embodiments, any portion of the flow, circuits or systems illustrated in any one or more of the figures, and any of the embodiments illustrated and/or described herein can be included in or be implemented by computing device 400. The computing device 400 may be, for example, a computing device, a controller, a control unit, an application specific controller, and/or an embedded controller, among others.

The computing device 400 may include a processor 402 that is adapted to execute stored instructions (for example, instructions 403), as well as a memory device 404 (or storage 404) that stores instructions 405 that are executable by the processor 402. The processor 402 can be a single core processor, a multi-core processor, a computing cluster, or any number of other configurations. For example, processor 402 can be an Intel® processor such as an Intel® Celeron, Pentium, Core, Core i3, Core i5, or Core i7 processor. In some embodiments, processor 402 can be an Intel® x86 based processor. In some embodiments, processor 402 can be an ARM based processor. The memory device 404 can be a memory device or a storage device, and can include volatile storage, non-volatile storage, random access memory, read only memory, flash memory, or any other suitable memory or storage systems. The instructions that are executed by the processor 402 may also be used to implement secure battery authentication, etc. as illustrated and/or described in this specification. In some embodiments, processor 402 may include the same or similar features or functionality as, for example, various controllers or agents in this disclosure.

The processor 402 may also be linked through the system interconnect 406 (e.g., PCI®, PCI-Express®, NuBus, etc.) to a display interface 408 adapted to connect the computing device 400 to a display device 410. The display device 410 may include a display controller 430. Display device 410 may also include a display screen that is a built-in component of the computing device 400. The display device may also include a computer monitor, television, or projector, among others, that is externally connected to the computing device 400. In some embodiments, computing device 400 does not include a display interface or a display device.

In some embodiments, the display interface 408 can include any suitable graphics processing unit, transmitter, port, physical interconnect, and the like. In some examples, the display interface 408 can implement any suitable protocol for transmitting data to the display device 410. For example, the display interface 408 can transmit data using a high-definition multimedia interface (HDMI) protocol, a DisplayPort protocol, or some other protocol or communication link, and the like In addition, a network interface controller (also referred to herein as a NIC) 412 may be adapted to connect the computing device 400 through the system interconnect 406 to a network (not depicted). The network (not depicted) may be a cellular network, a radio network, a wide area network (WAN), a local area network (LAN), or the Internet, among others.

The processor 402 may be connected through system interconnect 406 to an input/output (I/O) device interface 414 adapted to connect the computing host device 400 to one or more I/O devices 416. The I/O devices 416 may include, for example, a keyboard or a pointing device, where the pointing device may include a touchpad or a touchscreen, among others. The I/O devices 416 may be built-in components of the computing device 400, or may be devices that are externally connected to the computing device 400.

In some embodiments, the processor 402 may also be linked through the system interconnect 406 to a storage device 418 that can include a hard drive, a solid-state drive (SSD), a magnetic drive, an optical drive, a USB flash drive, an array of drives, or any other type of storage, including combinations thereof. In some embodiments, the storage device 418 can include any suitable applications that can be used by processor 402 to implement any of the techniques illustrated and/or described herein. In some embodiments, storage 418 stores instructions 419 that are executable by the processor 402. In some embodiments, the storage device 418 can include a basic input/output system (BIOS).

In some embodiments, a power device 422 is provided. For example, in some embodiments, power device 422 can provide secure battery authentication, etc. Power 422 can also include any of the safe mode power generation logic and/or the safe voltage generation logic illustrated and/or described herein. In some embodiments, power 422 can include one or more sources of power supply such as one or more power supply units (PSUs). In some embodiments, power 422 can be a part of system 400, and in some embodiments, power 422 can be external to the rest of system 400. In some embodiments, power 422 can provide secure battery authentication, or any other techniques such as those illustrated and/or described herein. For example, in some embodiments, power 422 can provide any of the techniques as described in reference to or illustrated in any of the drawings herein.

FIG. 4 also illustrates system components 424. In some embodiments, system components 424 can include any of display, camera, audio, storage, modem, or memory components, or any additional system components. In some embodiments, system components 424 can include any system components for which power, voltage, power management, etc. can be implemented according to some embodiments as illustrated and/or described herein.

It is to be understood that the block diagram of FIG. 4 is not intended to indicate that the computing device 400 is to include all of the components shown in FIG. 4 in all embodiments. Rather, the computing device 400 can include fewer or additional components not illustrated in FIG. 4 (e.g., additional memory components, embedded controllers, additional modules, additional network interfaces, etc.). Furthermore, any of the functionalities of power device 422 may be partially, or entirely, implemented in hardware or in a processor such as processor 402. For example, the functionality may be implemented with an application specific integrated circuit, logic implemented in an embedded controller, or in logic implemented in the processor 402, among others. In some embodiments, the functionalities of power device 422 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 422 can be implemented with an integrated circuit.

Figure 5:
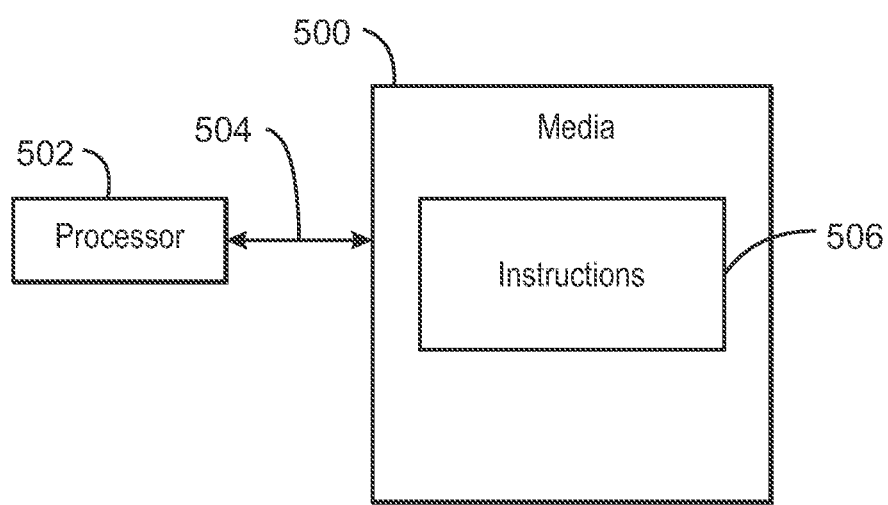
FIG. 5 illustrates one or more processors and one or more media in accordance with some embodiments.

FIG. 5 is a block diagram of an example of one or more processors 502 and one or more tangible, non-transitory computer readable media 500 for secure battery authentication, safe voltage generating, and/or safe power mode generating, etc. The one or more tangible, non-transitory, computer-readable media 500 may be accessed by the processor(s) 502 over a computer interconnect 504. Furthermore, the one or more tangible, non-transitory, computer-readable media 500 may include instructions (or code) 506 to direct the processor(s) 502 to perform operations as illustrated and/or described herein. In some embodiments, processor 502 is one or more processors. In some embodiments, processor(s) 502 can perform some or all of the same or similar functions that can be performed by other elements illustrated and/or described herein using instructions (code) 506 included on media 500 (for example, some or all of the functions or techniques illustrated in and/or described in reference to any of FIGS. 1-4). In some embodiments, one or more of processor(s) 502 may include the same or similar features or functionality as, for example, various controllers, units, or agents, etc. illustrated and/or described in this disclosure. In some embodiments, one or more processor(s) 502, interconnect 504, and/or media 500 may be included in computing device 400.

Various components discussed in this specification may be implemented using software components. These software components may be stored on the one or more tangible, non-transitory, computer-readable media 500, as indicated in FIG. 5. For example, secure battery authentication, safe voltage generating, and/or safe power mode generating, etc. may be adapted to direct the processor(s) 502 to perform one or more of any of the operations described in this specification and/or in reference to the drawings.

It is to be understood that any suitable number of software components may be included within the one or more tangible, non-transitory computer-readable media 500. Furthermore, any number of additional software components shown or not shown in FIG. 5 may be included within the one or more tangible, non-transitory, computer-readable media 500, depending on the specific application.

The various techniques and/or operations described herein (for example, in reference to any one or more of FIGS. 1-4) may be performed by a control unit comprised of one or more processors, monitoring logic, control logic, software, firmware, agents, controllers, logical software agents, system agents, and/or other modules. For example, in some embodiments, some or all of the techniques and/or operations illustrated and/or described herein may be implemented by a system agent. Due to the variety of modules and their configurations that may be used to perform these functions, and their distribution through the system and/or in a different system, they are not all specifically illustrated in their possible locations in the figures.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, an apparatus to authenticate a battery includes a controller to monitor a voltage of the battery, to filter the voltage of the battery, and to provide the filtered voltage to turn on circuitry to be used to authenticate the battery.

Example 2 includes the subject matter of example 1. The filtered voltage is a safe voltage adequate to authenticate the battery.

Example 3 includes the subject matter of any of examples 1-2. The controller is to identify connection of the battery.

Example 4 includes the subject matter of any of examples 1-3. The controller is to determine if the battery is legitimate. If the battery is legitimate, the controller is to allow boot up of a device using the battery. If the battery is not legitimate, the controller is to prevent voltage from being provided from the battery to the device.

Example 5 includes the subject matter of any of examples 1-4. The controller is to determine if the battery is legitimate using cryptography.

Example 6 includes the subject matter of any of examples 1-5. The controller is to provide only the filtered voltage to the device until the battery is determined to be legitimate.

Example 7 In some examples, an apparatus to authenticate a battery includes a battery voltage monitor to monitor a voltage of the battery, and a voltage source regulator to filter the voltage of the battery and provide the filtered voltage to turn on circuitry to be used to authenticate the battery.

Example 8 includes the subject matter of example 7. The filtered voltage is a safe voltage adequate to authenticate the battery.

Example 9 includes the subject matter of any of examples 7-8. A controller is to identify connection of the battery.

Example 10 includes the subject matter of any of examples 7-9. A secure battery authentication manager is to determine if the battery is legitimate. A power management controller is to boot up a device using the battery if the battery is legitimate, and is to prevent voltage from being provided from the battery to the device if the battery is not legitimate.

Example 11 includes the subject matter of any of examples 7-10. The secure battery authentication manager is to determine if the battery is legitimate using cryptography.

Example 12 includes the subject matter of any of examples 7-11. A power management controller is to provide only the filtered voltage to the device until the battery is determined to be legitimate.

Example 13 In some examples, a method to authenticate a battery includes monitoring a voltage of the battery, filtering the voltage of the battery, and providing the filtered voltage to turn on circuitry to be used to authenticate the battery.

Example 14 includes the subject matter of example 13. The filtered voltage is a safe voltage adequate to authenticate the battery.

Example 15 includes the subject matter of any of examples 13-14. The method includes identifying connection of the battery.

Example 16 includes the subject matter of any of examples 13-15. The method includes determining if the battery is legitimate. If the battery is legitimate, the method includes booting up a device using the battery. If the battery is not legitimate, the method includes preventing voltage from being provided from the battery to the device.

Example 17 includes the subject matter of any of examples 13-16. The method includes determining if the battery is legitimate using cryptography.

Example 18 includes the subject matter of any of examples 13-17. The method includes providing only the filtered voltage to the device until the battery is determined to be legitimate.

Example 19 In some examples, one or more tangible, non-transitory machine readable media includes a plurality of instructions that, in response to being executed on at least one processor, cause the at least one processor to monitor a voltage of the battery, filter the voltage of the battery, and provide the filtered voltage to turn on circuitry to be used to authenticate the battery.

Example 20 includes the subject matter of example 19. The filtered voltage is a safe voltage adequate to authenticate the battery.

Example 21 includes the subject matter of any of examples 19-20. The one or more tangible, non-transitory machine readable media include a plurality of instructions that, in response to being executed on at least one processor, cause the at least one processor to identify connection of the battery.

Example 22 includes the subject matter of any of examples 19-21. The one or more tangible, non-transitory machine readable media include a plurality of instructions that, in response to being executed on at least one processor, cause the at least one processor to determine if the battery is legitimate, and if the battery is legitimate, to boot up a device using the battery, and if the battery is not legitimate, to prevent voltage from being provided from the battery to the device.

Example 23 includes the subject matter of any of examples 19-22. The one or more tangible, non-transitory machine readable media include a plurality of instructions that, in response to being executed on at least one processor, cause the at least one processor to determine if the battery is legitimate using cryptography.

Example 24 includes the subject matter of any of examples 19-23. The one or more tangible, non-transitory machine readable media include a plurality of instructions that, in response to being executed on at least one processor, cause the at least one processor to provide only the filtered voltage to the device until the battery is determined to be legitimate.

Example 25 In some examples, machine-readable storage includes machine-readable instructions, when executed, to implement a method or realize an apparatus as in any other example.

Example 26 In some examples, one or more machine readable medium include(s) code, when executed, to cause a machine to perform the method of any other example.

Example 27 In some examples, an apparatus includes means to perform a method as in any other example.

Example 28 In some examples, an apparatus includes a control unit. The apparatus includes means to perform a method as in any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus to authenticate a battery, comprising:
   a power interface to receive a voltage of the battery; and
   a controller coupled to the power interface, the controller to:
      monitor the voltage of the battery;
      filter the voltage of the battery to generate a filtered voltage that is non-zero and has a lower voltage level than the voltage of the battery; and
      provide the filtered voltage to turn on circuitry to be used to authenticate the battery.

2. The apparatus of claim 1, wherein the filtered voltage is a safe voltage adequate to authenticate the battery and inadequate to power a processor that is to be powered by the voltage of the battery.

3. The apparatus of claim 1, wherein the controller is further to:
   identify connection of the battery, wherein the filtered voltage is provided to the circuitry based on the identification.

4. The apparatus of claim 1,
   wherein to authenticate the battery includes to determine if the battery is legitimate, and wherein the controller is further to:
   if the battery is legitimate, boot up a device using the battery; and
   if the battery is not legitimate, prevent voltage from being provided from the battery to the device.

5. The apparatus of claim 4, wherein the controller is to:
   determine if the battery is legitimate using cryptography.

6. The apparatus of claim 1, wherein the controller is to provide only the filtered voltage to a device, that is to be powered by the battery, until the battery is determined to be legitimate.

7. An apparatus to authenticate a battery, comprising:
   a battery voltage monitor to monitor a voltage of the battery;
   a voltage source regulator to filter the voltage of the battery and provide the filtered voltage to turn on circuitry to be used to authenticate the battery, wherein the filtered voltage is non-zero and has a lower voltage level than the voltage of the battery.

8. The apparatus of claim 7, wherein the filtered voltage is a safe voltage adequate to authenticate the battery.

9. The apparatus of claim 7, comprising a controller to identify connection of the battery, wherein the voltage source regulator is to provide the filtered voltage to the circuitry based on the identification.

10. The apparatus of claim 7, further comprising:
    a secure battery authentication manager to determine if the battery is legitimate; and a power management controller to boot up a device using the battery if the battery is legitimate, and to prevent voltage from being provided from the battery to the device if the battery is not legitimate.

11. The apparatus of claim 10, wherein the secure battery authentication manager is to determine if the battery is legitimate using cryptography.

12. The apparatus of claim 7, comprising a power management controller to provide only the filtered voltage to a device, that is to be powered by the battery, until the battery is determined to be legitimate.

13. A method to authenticate a battery, comprising:
monitoring a voltage of the battery;
filtering the voltage of the battery to generate a filtered voltage that is non-zero and has a lower voltage level than the voltage of the battery; and
providing the filtered voltage to turn on circuitry to be used to authenticate the battery.

14. The method of claim 13, wherein the filtered voltage is a safe voltage adequate to authenticate the battery.

15. The method of claim 13, further comprising identifying connection of the battery, wherein the filtered voltage is provided to the circuitry based on the identification.

16. The method of claim 13, comprising:
determining if the battery is legitimate;
if the battery is legitimate, booting up a device using the battery; and
if the battery is not legitimate, preventing voltage from being provided from the battery to the device.

17. The method of claim 16,
wherein the determining if the battery is legitimate is performed using cryptography.

18. The method of claim 13, comprising providing only the filtered voltage to a device, that is to be powered by the battery, until the battery is determined to be legitimate.

19. One or more tangible, non-transitory machine readable media comprising a plurality of instructions that, in response to being executed on at least one processor, cause the at least one processor to:
monitor a voltage of the battery;
filter the voltage of the battery to generate a filtered voltage that is non-zero and has a lower voltage level than the voltage of the battery; and
provide the filtered voltage to turn on circuitry to be used to authenticate the battery.

20. The one or more tangible, non-transitory machine readable media of claim 19, wherein the filtered voltage is a safe voltage adequate to authenticate the battery.

21. The one or more tangible, non-transitory machine readable media of claim 19, comprising a plurality of instructions that, in response to being executed on at least one processor, cause the at least one processor to:
identify connection of the battery, wherein the filtered voltage is provided to the circuitry based on the identification.

22. The one or more tangible, non-transitory machine readable media of claim 19, comprising a plurality of instructions that, in response to being executed on at least one processor, cause the at least one processor to:
determine if the battery is legitimate;
if the battery is legitimate, boot up a device using the battery; and
if the battery is not legitimate, prevent voltage from being provided from the battery to the device.

23. The one or more tangible, non-transitory machine readable media of claim 22, comprising a plurality of instructions that, in response to being executed on at least one processor, cause the at least one processor to:
determine if the battery is legitimate using cryptography.

24. The one or more tangible, non-transitory machine readable media of claim 19, comprising a plurality of instructions that, in response to being executed on at least one processor, cause the at least one processor to:
provide only the filtered voltage to a device, that is to be powered by the battery, until the battery is determined to be legitimate.

* * * * *